UNITED STATES PATENT OFFICE.

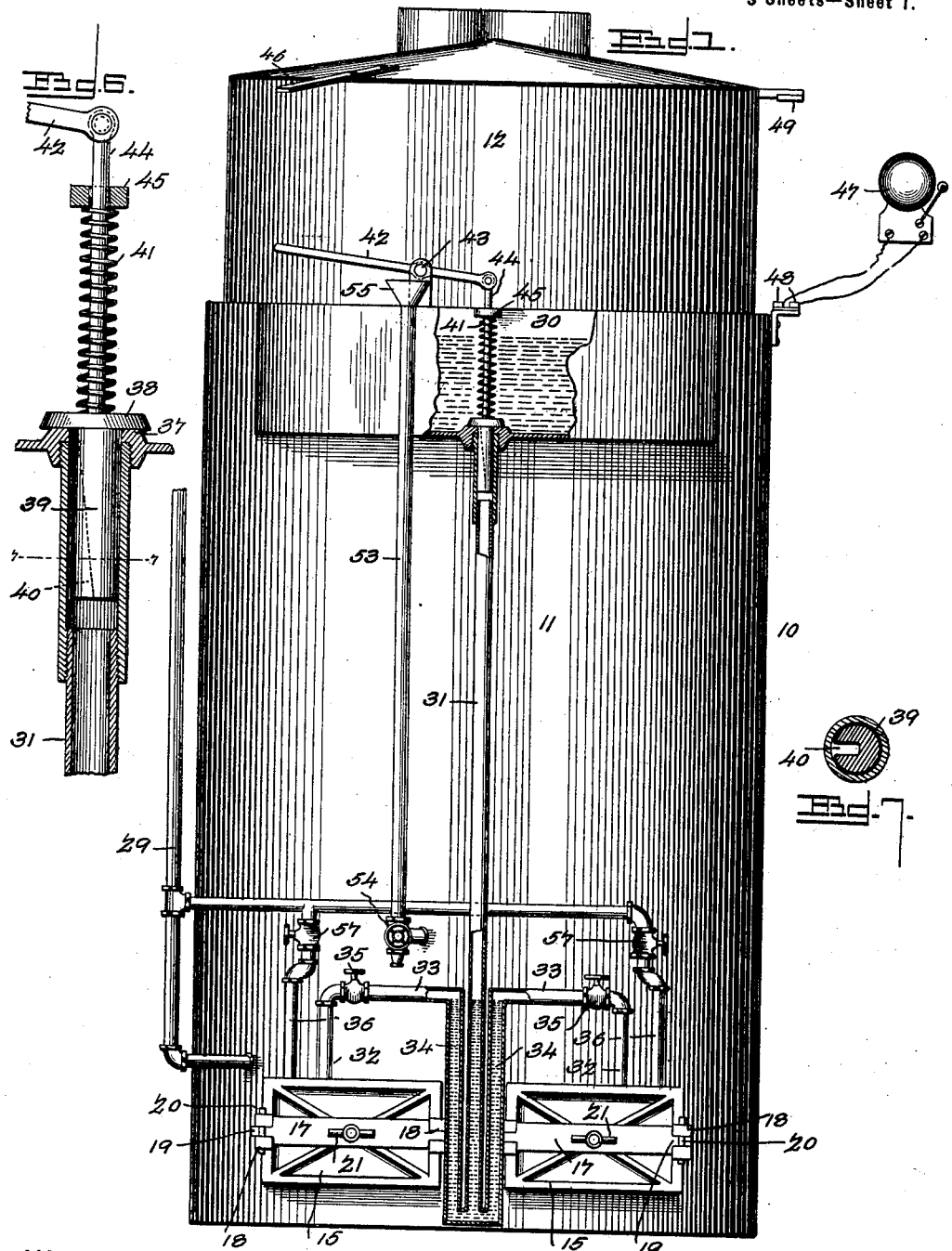

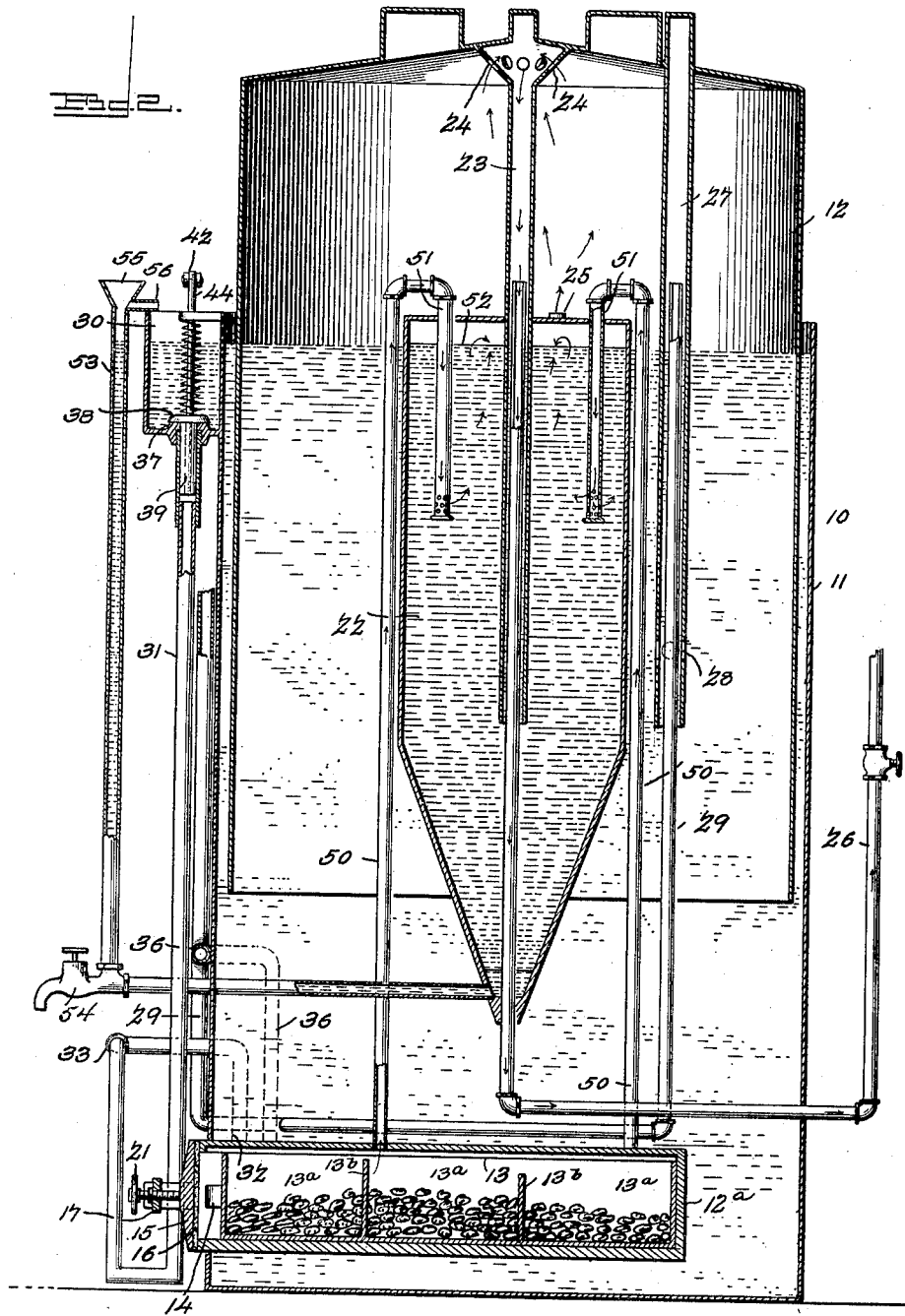

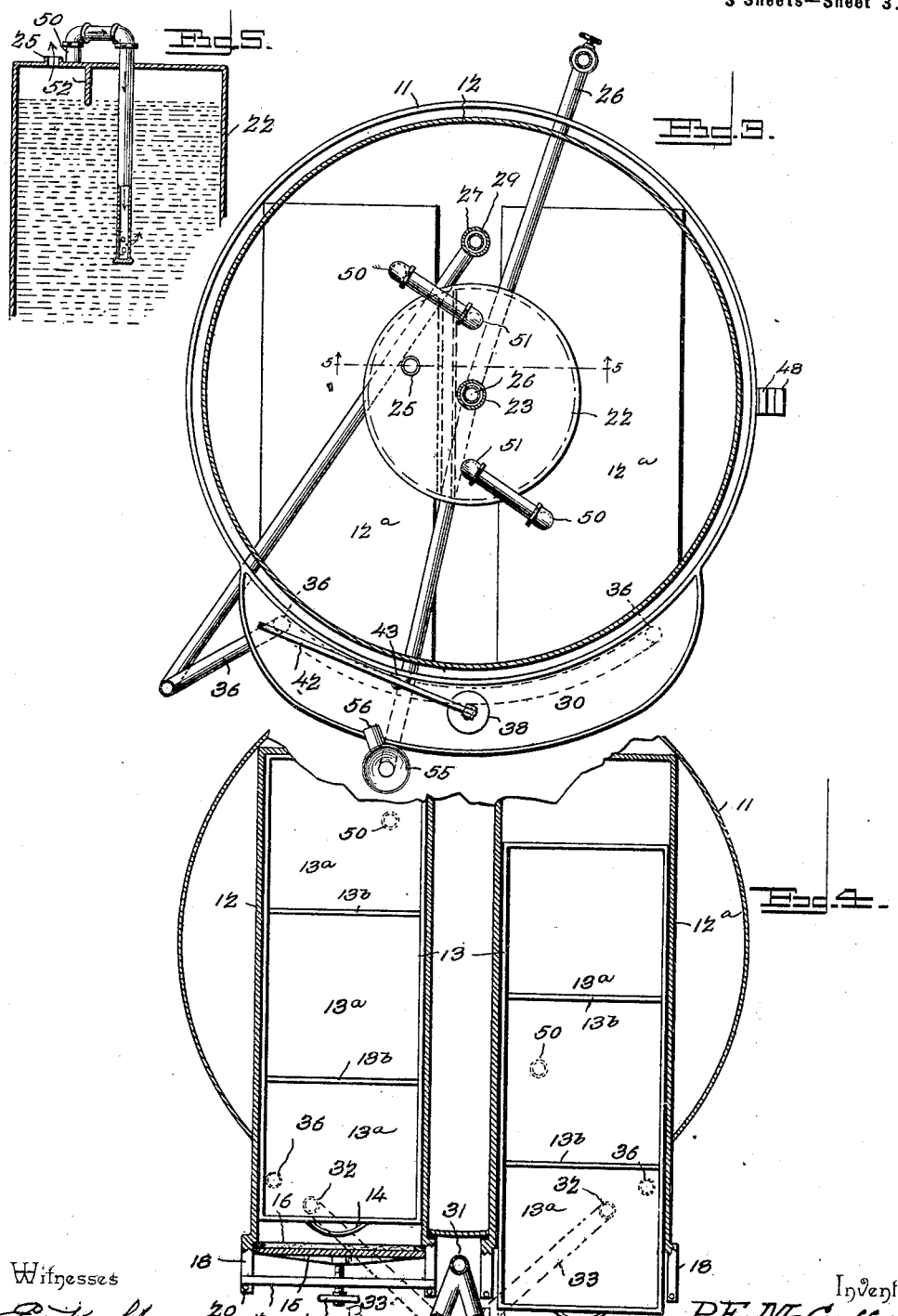

PETER F. McCAFFREY AND THOMAS E. McCAFFREY, OF SALT LAKE CITY, UTAH.

ACETYLENE-GAS GENERATOR.

SPECIFICATION forming part of Letters Patent No. 673,843, dated May 7, 1901.

Application filed April 24, 1900. Serial No. 14,183. (No model.)

*To all whom it may concern:*

Be it known that we, PETER F. McCAFFREY and THOMAS E. McCAFFREY, citizens of the United States, residing at Salt Lake City, in the county of Salt Lake and State of Utah, have invented a new and useful Acetylene-Gas Generator, of which the following is a specification.

Our invention is an improved acetylene-gas generator, one object of our invention being to provide means whereby the air in the generating-chamber is expelled therefrom before the gas passes to the gas-holder, thereby preventing the air from mixing with the gas in the gas-holder and injuring the illuminating properties thereof.

A further object of our invention is to provide means for cooling the generating-chamber.

A further object of our invention is to provide means for cooling and washing the gas prior to its introduction into the gas-holder.

A further object of our invention is to provide means for automatically supplying water to the carbid in the generating-chamber as the same is required.

Our invention consists in the peculiar construction and combination of devices hereinafter fully set forth, and pointed out in the claims.

In the accompanying drawings, Figure 1 is a side elevation, partly in section, of an acetylene-gas-generating apparatus embodying our improvements. Fig. 2 is a vertical sectional view of the same. Fig. 3 is a horizontal sectional view of the same. Fig. 4 is a similar view on a lower plane. Fig. 5 is a detail vertical sectional view taken on the line 5 5 of Fig. 3. Fig. 6 is a detail view of the water-supply valve and its connections. Fig. 7 is a detail sectional view taken on the line 7 7 of Fig. 6.

In the embodiment of our invention we employ an expansible gas-holder 10, comprising a water-tank 11 and a bell 12. In the lower portion of the water-tank are placed generating-chambers 12ª, which may be of any suitable form and are here shown as of oblong rectangular form and open at their outer ends, which project through one side of the water-tank. Said generating-chambers have no connection with the water-tank and are independent of each other. We have here shown two of the generating-chambers; but it will be understood that any desired number thereof may be used. In each generating-chamber is a removable carbid-receptacle 13, here shown as in the form of a drawer and provided at the outer end with a pull or handle 14, whereby it may be readily removed from the generating-chamber through the open end thereof. The open end of each generating-chamber is provided with a suitable closure 15. A suitable packing 16 is interposed between the outer end of the generating-chamber and the inner side of the closure, and the latter in the form of our invention here shown is provided with a locking-bar 17, hinged at one end to a pair of ears or lugs 18 and adapted to be fastened at its free end to a pair of lugs or ears 19 by a pin or bolt 20. A compression-screw 21 is carried by the locking-bar and bears against the outer side of the closure 15, as shown, thereby securely closing the same on the outer end of the generating-chamber.

Arranged within the water-tank is a gas-purifying tank 22, of suitable form and construction, which is independent of the water-tank and has no connection therewith other than that it is surrounded and immersed in the water in the tank and cooled thereby, the water in the tank also serving to keep the generating-chambers cool, as will be understood. A pipe 23 depends from the bell and communicates with the interior thereof, as at 24, and said depending pipe extends downward in the gas-purifying tank 22 and is adapted to play vertically in an opening in the top of said gas-purifying tank. The latter has an opening 25 to admit of the passage of gas therefrom to the interior of the bell. A service-pipe 26 leads from the interior of the pipe 23 downward through the gas-purifying tank and out through the water-tank 11, as shown, and a water seal is formed between the immersed lower portion of the pipe 23 in the gas-purifying tank and the said service-pipe. A pipe 27 also depends from the bell and extends downward into the water in the tank, the lower end of said pipe 27 being at a higher plane than the lower end of the bell, and said pipe 27 is provided with openings 28 at a suitable distance from its lower end. A vent-pipe 29 is sealed in said pipe 27 and passes downward into and through the water-tank and outward therefrom to the external atmosphere at a suitable point. When the bell becomes surcharged with gas, the excess passes into the pipe 27 through the openings 28, which become uncovered by the raising of the bell, and escapes through the vent-pipe 29, thereby obviating danger of explosion.

On one side of the water-tank 11 is a water-supply tank 30. A pipe 31 leads from the bottom of said water-supply tank to the generating-chambers 12$^a$ and communicates therewith, as at 32, through branches 33, each of which is connected to the lower end of the pipe 31, whereby water seals 34 are formed in the connections between the water-supply tank and the generating-chamber. Each branch 33 is provided with a cock 35, whereby either of the generating-chambers may be cut off from the water-supply pipe 31. Vent-pipes 36 lead from the upper sides of the gas-generating chambers to the vent-pipe 29. A valve-seat 37 is formed in the bottom of the water-supply tank 30 at the upper end of the pipe 31, and a valve 38 is seated therein and has a depending stem 39. The said stem is channeled on one side, as at 40, to form a passage for the water through the said stem into the pipe 31 when the said valve is raised from its seat, and it will be observed by reference to Fig. 6 that the said channel is wider at its lower end than at its upper end, and hence that the capacity thereof increases as the valve is raised. A spring 41 bears on the upper side of the valve and normally closes the same against the valve-seat 37. A lever 42 is fulcrumed on a support 43 at a suitable point over the water-supply tank, and the inner end of said lever is connected to the valve by a rod 44, which passes downward through a suitable guide 45, with which the water-supply tank is provided, and through the spring 41 when the latter is a coiled extensible spring, as here shown; but it will be understood that any preferred form of spring may be employed. The outer end of the lever 42 projects into the path of a suitable tappet 46, which is carried by the bell and which on the descent of the bell when the gas therein is nearly exhausted engages the lever 42 and causes the same to raise the valve 38, and thereby permit the water to flow from the water-supply tank 30 to the generating-chambers. When the gas is not being rapidly consumed, the bell settles or descends very slowly, and at the initial engagement of the tappet 46 thereof with the lever 43 the valve 38 will be raised only a slight distance and that portion of the channel 40 thereof which has the least capacity will be uncovered to the water in the water-supply tank, and hence only a small quantity of water will be supplied to the carbid in the generating-chamber, which supply will continue only until the newly-generated gas causes the bell to reascend and the tappet 46 to be disengaged from the lever 42. In the event that the gas is being consumed rapidly the bell will of course descend more rapidly and the graduated valve will be opened to an extent commensurate with a needed supply of water to the carbid. In the event that the carbid is no longer active the bell will continue to descend as the residue of gas therein is expended and the tappet 46 will pass over and clear the outer end of the lever 42 as the bell finally settles, thereby releasing said lever 42, when the spring 41 will restore the valve to its initial position and cut off the supply of water to the inert carbid in the generating-chambers.

In connection with our improved acetylene-gas-generating apparatus we employ an electrical annunciator (indicated diagrammatically at 47) connected in open circuit with terminals 48 at the upper side of the water-tank 11. The bell carries a conductor 49, which when the bell nears the lowest point of its movement, when there is only a small quantity of gas therein, contacts with the terminals 48, closes the circuit, and thereby causes the annunciator to sound an alarm indicating that the gas is about exhausted and that the apparatus requires immediate attention.

Gas-pipes 50 lead from the generating-chambers 12$^a$ to the interior of the gas-purifying tank 22, the said gas-pipes 50 having feet 51, which depend and are immersed in the water in the said gas-purifying chamber. Baffles 52, with which the said gas-purifying chamber or tank is provided, are interposed between the immersed discharge ends of the said gas-pipes 50 and the openings 25, through which the gas passes from the gas-purifying tank into the bell, the lower edges of said baffles being barely submerged and said baffles forming tortuous passages for the gas, through which the same is required to pass between its exit from the pipes 50 and its exit from the gas-purifying tank, and hence the gas is thoroughly washed, cooled, and purified during its passage through the water in the gas-purifying tank, and said baffles serving as condensers on which the water carried by the freshly-generated gas collects.

A pipe 53 leads from a point slightly above the water-supply tank 30 to the bottom of the gas-purifying tank within the water-tank 11, and the said pipe 53 is provided at a suitable point with a blow-off valve or cock 54, through which the contents of the gas-purifying tank may be drawn and discharged when the same is required. Said pipe 53 has at its upper end a funnel 55, whereby water may be readily poured into it, and is furthermore provided with a spout 56, which discharges into the water-supply tank 30. The gas-purifying tank 22 is supplied with water through the pipe 53, and the water-supply tank 30 is also filled with water to the desired extent.

It is highly desirable in gas-generating apparatus of this class to prevent the mixing of air with the acetylene gas in the gas-holder to any extent, as such admixture of air with the gas seriously reduces the illuminating power of the latter, and one of the leading objects of our invention is to prevent such mixture of air with the gas in the gas-holder. This we accomplish by opening the valves 57, with which the vent-pipes 36, which lead from the generating-chambers, are provided, prior to the introduction of water to the carbid, so that such air as is contained in the generating-chambers will be expelled therefrom through said vent-pipes 36 and not pass into the gas-holder, the said valves 57 being closed immediately after such air has been expelled, together with some of the gas resulting from the initial generation.

Each carbid-receptacle 13 is divided into a suitable number of pockets 13ª, each capable of containing a charge of carbid, by a series of partition-plates 13ᵇ, which are successively lower as they recede from the front ends of the carbid-receptacle. Hence they act successively, the charge in each pocket being brought into action as the preceding pocket overflows with water.

It will be understood that in addition to the function heretofore ascribed to the pipe 53 of replenishing the gas-purifying tank with water as the same may be required the construction and coaction of the pipe 53 and water-supply tank 30 are such that an excess of water in the gas-purifying tank resulting from the water condensed from the freshly-generated gas on the baffles 52 will be removed by the pressure of gas therein, the same flowing from the pipe 53 into the water-supply tank.

Having thus described our invention, we claim—

1. An acetylene-gas-generating apparatus comprising a water-tank, a gas-bell, a generating-chamber and purifying-tank in said water-tank, the pipes 50 leading from the generating-chamber, through the water-tank, to the purifying-tank and having their discharge ends downturned in the latter, said purifying-tank having gas-outlets communicating with the interior of the bell, and baffle-plates disposed between the pipes 50 and said gas-outlets, substantially as described.

2. An acetylene-gas-generating apparatus comprising the water-tank and gas-bell, the generating-chamber and purifying-tank in said water-tank, said gas-generating chamber having gas connection with the purifying-tank and the latter having gas connection with the interior of the gas-bell, a water-supply tank, a pipe leading therefrom to the generating-chamber, a valve in said pipe, connections, actuated automatically by the bell, to operate said valve, a pipe to supply water to the purifying-tank and having a funnel and spout, the latter discharging in the water-supply tank, and a service-pipe communicating with the interior of said bell, substantially as described.

3. In acetylene-gas-generating apparatus, a water-tank, a gas-purifying tank and gas-generating chamber therein, a water-supply tank having a valved water connection with the gas-generating chamber, the latter having gas connection through the purifying-tank with the interior of the bell, and a water-pipe leading to the gas-purifying tank, to supply the latter, said pipe having a funnel at its upper end and a spout discharging into the water-supply tank, substantially as described.

4. An acetylene-gas-generating apparatus comprising a water-tank, a bell, a generating-chamber and purifying-tank in the said water-tank, a gas-pipe leading from the generating-chamber, through the water in the water-tank to the purifying-tank and discharging into the latter, said purifying-tank having gas connection with the interior of the bell, a water-supply pipe leading from without the water-tank to said purifying-tank, the latter not communicating with the water-tank, and means to supply water to the generating-chamber, substantially as described.

In testimony that we claim the foregoing as our own we have hereto affixed our signatures in the presence of two witnesses.

PETER F. McCAFFREY.
THOMAS E. McCAFFREY.

Witnesses:
  W. H. CROMER,
  JAS. W. CAMPBELL.